US008335057B2

(12) United States Patent
Osugi et al.

(10) Patent No.: US 8,335,057 B2
(45) Date of Patent: Dec. 18, 2012

(54) CPP MAGNETORESISTIVE HEAD

(75) Inventors: Masahiro Osugi, Kanagawa-ken (JP);
Takayoshi Ohtsu, Kanagawa-ken (JP);
Shigeo Fujita, Kanagawa-ken (JP);
Katsuro Watanabe, Kanagawa-ken (JP);
Koji Kataoka, Kanagawa-ken (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 670 days.

(21) Appl. No.: 12/536,255

(22) Filed: Aug. 5, 2009

(65) Prior Publication Data
US 2010/0046121 A1 Feb. 25, 2010

(30) Foreign Application Priority Data
Aug. 22, 2008 (JP) ................................. 2008-214262

(51) Int. Cl.
*G11B 5/33* (2006.01)
(52) U.S. Cl. .................................. 360/324.12
(58) Field of Classification Search ........................ None
See application file for complete search history.

(56) References Cited

U.S. PATENT DOCUMENTS

| 6,404,603 B1 | 6/2002 | Inoue et al. ................... 360/320 |
| 6,414,825 B1 | 7/2002 | Inoue et al. ................... 360/320 |
| 7,126,794 B2 | 10/2006 | Kudo et al. ................... 360/313 |
| 7,327,539 B2 | 2/2008 | Saito ........................ 360/324.1 |
| 7,649,713 B2 * | 1/2010 | Ota et al. ................. 360/125.32 |
| 2004/0175588 A1 * | 9/2004 | Sato et al. ..................... 428/493 |
| 2004/0246630 A1 * | 12/2004 | Otomo ........................ 360/317 |
| 2006/0077591 A1 * | 4/2006 | Kurihara et al. ............. 360/128 |
| 2006/0291098 A1 * | 12/2006 | Ota et al. ...................... 360/128 |
| 2007/0217079 A1 * | 9/2007 | Sato et al. ...................... 360/317 |

FOREIGN PATENT DOCUMENTS

| JP | 06-274830 | 9/1994 |
| JP | 07-296337 | 11/1995 |
| JP | 10-222819 | 8/1998 |
| JP | 2000-182222 | 6/2000 |
| JP | 2001-236614 | 8/2001 |
| JP | 2006-134461 | 5/2006 |

* cited by examiner

*Primary Examiner* — David D Davis
(74) *Attorney, Agent, or Firm* — Zilka-Kotab, PC

(57) ABSTRACT

According to one embodiment, a CPP magnetoresistive head includes a magnetoresistive film comprising a free layer above a non-magnetic intermediate layer and a fixed layer below the non-magnetic intermediate layer, wherein the magnetoresistive film is between a lower magnetic shield layer and an upper magnetic shield layer. The CPP magnetoresistive head also includes a domain control film on each side of the magnetoresistive film, wherein a sense current flows through the magnetoresistive film between the upper magnetic shield layer and the lower magnetic shield layer. The CPP magnetoresistive head also includes a high heat conductivity layer, and a heat dissipation layer having a high heat conductivity and a low linear expansion coefficient, the heat dissipation layer being disposed at the back in a device height direction of the magnetoresistive film and on each side of the domain control film.

19 Claims, 10 Drawing Sheets

Fig. 3

| | Al | Au | Be | Co | Ir | Mg | Mo | W | Rh | Ru | Cr |
|---|---|---|---|---|---|---|---|---|---|---|---|
| Heat conductivity (w/m·k) | 238 | 319 | 218 | 100 | 147 | 157 | 138 | 174 | 150 | 105 | 96 |
| Electroconductivity (×1E6/m·Ω) | 37.7 | 45.2 | 31.3 | 17.2 | 19.7 | 22.6 | 18.7 | 18.9 | 21.1 | 13.7 | 7.74 |

| NiFe |
|---|
| 25 |
| 23 |

Fig. 4

| | Si | SiC | AlN | DLC | Alumina |
|---|---|---|---|---|---|
| Linear expansion coefficient (×1E-6/°C) | 2.4 | 4 | 4.5 | 3.8 | 7.1 |
| Heat conductivity (w/m·k) | 148 | 200 | 90 | 210 | 1.8 |

CPP MAGNETORESISTIVE HEAD

RELATED APPLICATIONS

The present application claims the priority of a Japanese patent application filed Aug. 22, 2008 under application number 2008-214262, which is incorporated herein by reference.

FIELD OF THE INVENTION

The present invention concerns a magnetic read head including a magnetoresistive film for reading magnetically recorded information, and particularly relates to a magnetoresistive head of a Current Perpendicular to Plane (CPP) structure for flowing a detection current to the film plane in a perpendicular direction.

BACKGROUND OF THE INVENTION

A magnetic recording device, for example, a hard disk drive, has gradually been expected to provide more storage capacity as the recent trend of the information society has demanded it. One way to increase the storage capacity of magnetic recording devices is to increase the recording density per unit area of the magnetic recording device, and improvement in techniques for increasing the sensitivity of a read device that utilizes the magnetoresistive effect and for narrowing a track width have been identified.

While magnetic signals on a recording medium have been converted into electric signals by using an anisotropic magnetoresistive effect (AMR) at a low recording density of several $Gb/in^2$, a read device using a giant magnetoresistive effect (GMR) of higher sensitivity has been used for higher recording density than that described above. However, along with improvement of higher recording density, use of a high sensitive read device such as a GMR (CPP-GMR) or tunnel magnetoresistive effect (TMR) device of a CPP (current perpendicular to the plane) system in which a detection current flows in a perpendicular direction to the film plane is very useful. Further, for narrowing the track width, development has been made in regard to the technique of narrowing a resist dimension by exposure conditions in the mask pattern formation.

The CPP structure magnetoresistive head generally includes a problem that the portion of the magnetoresistive film tends to generate heat more than that in a CIP (current into the plane) structure magnetoresistive head. In the CIP structure head, since sense current flows in the in-plane direction of the stacked plane in the stacked film of the magnetoresistive sensor film, more sense current flows to a layer comprising a material of lower electric resistivity and less sense current flows to a material of higher electric resistivity in the layers constituting the magnetoresistive film. Generally, the material of lower electric resistivity described above is an intermediate layer (e.g., Cu) provided between two ferromagnetic layers which are an important part of generating the magnetoresistive effect, and flowing of a large sense current in this layer means producing a high output. Further, a material of higher electric resistivity is an anti-ferromagnetic layer, that is, an anti-ferromagnetic material or a permanent magnet material, and decrease in the sense current flowing therethrough means also the suppression of heat generation.

On the other hand, in the CPP structure magnetoresistive head, since a sense current flows through the stacked plane of a magnetoresistive film, an identical current flows basically to all of the layers. That is, when a large sense current flows to an intermediate layer provided between two ferromagnetic layers which are an important part for generating the magnetoresistive effect, an identical current flows also to the anti-ferromagnetic layer of high electric resistivity to result in large heat generation. In the case of a metal, since the electric resistivity increases along with a rise of temperature, the resistance of the magnetoresistive film of the CPP structure magnetoresistive head increases by the heat generation. Therefore, an MR ratio is lowered to lower the read output. FIG. 10 shows the temperature dependence of the MR ratio in a current CPP structure magnetoresistive head. In FIG. 10, the abscissa shows the temperature of a magnetoresistive film and the ordinate shows an MR ratio. As shown in FIG. 10, as the temperature of the magnetoresistive film rises, the MR ratio is lowered, and the MR ratio showing about 11.5% at 20° C. lowers to about 10% at 50° C. and lowers to about 8.5% at 120° C. Further, since an insulating film is disposed on each side and in a device height direction of the magnetoresistive film of the CPP structure, the magnetoresistive film being a heat generation source, such that the sense current flows to a magnetoresistive film, a heat dissipation efficiency is also poor.

Jap. Pat. Appl. No. JP-A 2004-5763, which is hereby incorporated by reference, describes that the heat of a GMR film can be dissipated effectively by disposing a heat dissipation layer by way of an insulative layer on the side opposite to the side facing the recording medium of a GMR film. Jap. Pat. Appl. No. JP-A 2004-335071, which is hereby incorporated by reference, describes that the generation of Joule heat can be decreased in a CPP-GMR head by a structure in which an anti-ferromagnetic layer of high electric resistivity is disposed on the lateral surface in a track width direction or on the lateral surface in the device height direction of a fixed magnetic layer, and an anti-ferromagnetic layer is not disposed in a main path of the sense current.

SUMMARY OF THE INVENTION

According to one embodiment, a CPP magnetoresistive head includes a magnetoresistive film comprising a free layer above a non-magnetic intermediate layer and a fixed layer below the non-magnetic intermediate layer, wherein the magnetoresistive film is between a lower magnetic shield layer and an upper magnetic shield layer. The CPP magnetoresistive head also includes a domain control film disposed by way of an insulating film on each side of the magnetoresistive film, wherein a sense current flows through the magnetoresistive film between the upper magnetic shield layer and the lower magnetic shield layer, and a high heat conductivity layer disposed between the upper magnetic shield layer and the magnetoresistive layer or between the lower magnetic shield layer and the magnetoresistive film, and a heat dissipation layer having a high heat conductivity and a low linear expansion coefficient, the heat dissipation layer being disposed at the back in a device height direction of the magnetoresistive film and on each side of the domain control film, wherein the heat dissipation layer is disposed between the high heat conductivity layer and the upper magnetic shield layer or the lower magnetic shield layer.

According to another embodiment, a CPP magnetoresistive head comprises a read device including a magnetoresistive film having a free layer above a non-magnetic intermediate layer, and a fixed layer below the non-magnetic intermediate layer, wherein the magnetoresistive head is between a lower magnetic shield layer and an upper magnetic shield layer. The read device also includes a domain control film disposed by way of an insulating film on each side of the magnetoresistive film, wherein a sense current flows through the magnetoresistive film between the upper magnetic shield layer and the lower magnetic shield layer, a high heat conductivity layer disposed between the upper magnetic shield layer and the magnetoresistive film or between the lower magnetic shield layer and the magnetoresistive film, and a heat dissipation layer having a high heat conductivity and a low linear expansion coefficient, the heat dissipation layer being disposed at the back in a device height direction of the magnetoresistive film and on each side of the domain control film, wherein the heat dissipation layer is disposed between the high heat conductivity layer and the upper magnetic shield layer or the lower magnetic shield layer. The CPP magnetoresistive head also comprises a write device disposed adjacent to the read device.

Many other embodiments are also included, and described in relation to the embodiments.

BRIEF DESCRIPTION OF THE DRAWINGS

FIG. 3 is a chart showing materials having high heat conductivity and high electroconductivity.

FIG. 4 is a chart showing materials having high heat conductivity and low linear expansion coefficient.

DETAILED DESCRIPTION

Figure 1:
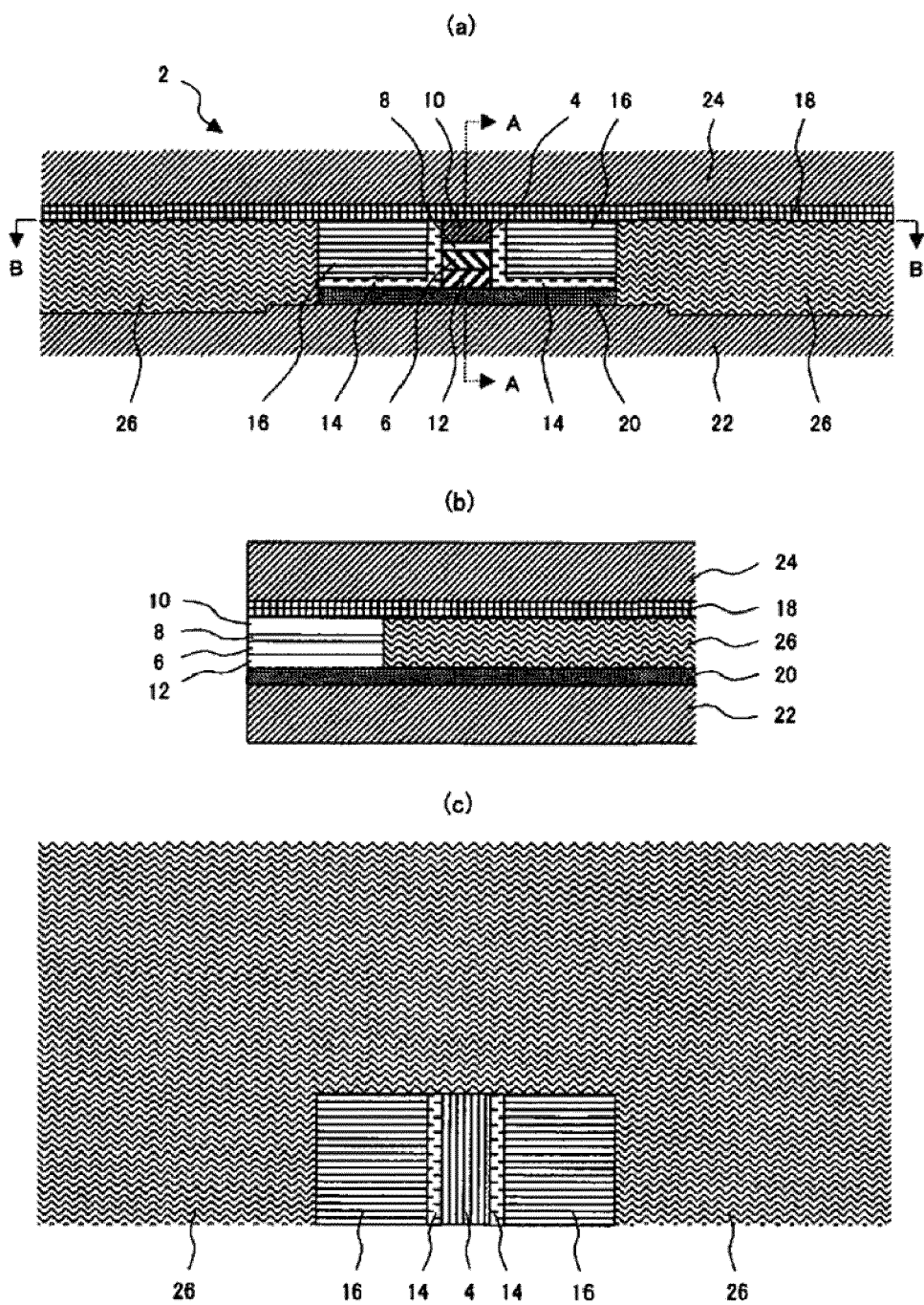
FIG. 1 is a diagram showing the constitution of a CPP magnetoresistive head (read device) according to Example 1.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of disk-based storage systems and/or related systems and methods, as well as operation and/or component parts thereof.

In a CPP magnetoresistive head, heat is less dissipated since the heat conduction of the magnetic shield layer is lower as compared with that anticipated so far. Further, in a case of a structure having a heat dissipation layer at the back in the device height direction of a GMR film, an undesired phenomenon is generated, in which the heat dissipation layer expands thermally to protrude the GMR device from the air bearing surface.

A CPP magnetoresistive head (read device) 2, according to one embodiment, includes a magnetoresistive film (CPP-GMR film) 4, a re-fill insulating film 14 for electrically insulating the magnetoresistive film 4, a domain control film 16 for controlling the magnetization direction of a free layer 10 by way of the re-fill insulating film 14, a first high heat conductivity layer 18 and a second high heat conductivity layer 20 disposed above and below the domain control film 16, an upper magnetic shield layer 24 and a lower magnetic shield layer 22 which are disposed above the conductivity layer 18 and below the conductivity layer 20 respectively and both serve as electrodes, a heat dissipation layer 26 having high heat conductivity and low linear expansion coefficient and disposed at the back in the device height direction of the magnetoresistive film 4 and on each side of the domain control film 16.

In the CPP structure magnetoresistive head, the portion of the magnetoresistive film tends to generate heat more than the CIP structure magnetoresistive head as described in the Background section, and, in addition, it has been found that heat dissipation is difficult since the heat conduction of the shield layer is not as favorable.

While Jap. Pat. Appl. No. JP-A 2004-5763 discloses the structure of disposing the heat dissipation layer by way of the insulative layer at the back in the device height direction of the GMR film, the insulative layer is required in this case to have a thickness sufficient to electrically insulate the GMR film and heat dissipation layer. However, considering that the heat conductivity of an insulative material is lower compared with that of a metal, expecting a high advantage of heat dissipation effect is difficult.

Jap. Pat. Appl. No. JP-A 2004-335071 discloses a structure in which an anti-ferromagnetic layer of high electric resistivity is disposed so as to be in contact with the lateral side in the track width direction or with the lateral side in the device height direction of the fixed magnetic layer, and the anti-ferromagnetic layer is not disposed in the main path of the sense current. In this structure, a sense current shunts only slightly in the anti-ferromagnetic layer of high electric resistivity, and the anti-ferromagnetic layer may generate less heat. However, since the anti-ferromagnetic layer is in contact only with the lateral side of the fixed magnetic layer, it results in a less effective fixing of the magnetization of a fixed magnetic layer. Further, since the lateral side of the fixed magnetic layer is formed by an etching process, crystals may be damaged and/or the surface may be oxidized in the fixed magnetic layer. Therefore, obtaining sufficient magnetic coupling to fix the magnetization of the fixed magnetic layer is difficult.

Further, in the structure in which the heat dissipation layer is disposed at the back in the device height direction of the GMR film, when the heat generated in the GMR film is transmitted to heat the dissipation layer, an undesired phenomenon is generated, in which heat dissipation layer expands thermally to protrude the GMR device from the air bearing surface (ABS). An object of the present invention according to one embodiment is to provide a magnetoresistive head of a CPP structure capable of efficiently dissipating the heat generated from the magnetoresistive film and with less protrusion of the magnetoresistive film from the ABS.

A CPP magnetoresistive head, according to one general embodiment, includes, between a lower magnetic shield layer and an upper magnetic shield layer, a magnetoresistive film having a free layer and a fixed layer above and below a non-magnetic intermediate layer and an anti-ferromagnetic layer, and a domain control film disposed by way of an insulating film on each side of the magnetoresistive film. In the CPP magnetoresistive head, a sense current flows so as to pass through the magnetoresistive film between the upper magnetic shield layer and the lower magnetic shield layer. The CPP magnetoresistive head includes a high heat conductivity layer disposed between the upper magnetic shield layer and the magnetoresistive layer or between the lower magnetic shield layer and the magnetoresistive film, and a heat dissipation layer having a high heat conductivity and a low linear expansion coefficient and disposed at the back in a device height direction of the magnetoresistive film and on each side of a domain control film and disposed between the high heat conductivity layer and the upper magnetic shield layer or the lower magnetic shield layer.

The heat dissipation layer having the high heat conductivity and the low linear expansion coefficient may preferably comprise AlN or DLC.

The high heat conductivity layer may preferably comprise at least one element selected from the group consisting of Al, Au, Be, Co, Ir, Mg, Mo, W, Rh, Ru, and Cr.

An insulating film may be disposed between the magnetoresistive film and the heat dissipation layer having the high heat conductivity and the low linear expansion coefficient, and Si or SiC may be used for the heat dissipation layer having the high heat conductivity and the low linear expansion coefficient.

The CPP magnetoresistive head may further include a write device.

The present invention, according to one embodiment, may provide a magnetoresistive head of the CPP structure capable of efficiently dissipating the heat generated from the magnetoresistive film and with less protrusion of the magnetoresistive film from the air bearing surface.

In the following description of preferred embodiments, a CPP type magnetoresistive head includes both a head having a read device that utilizes a CPP magnetoresistive film and a head having a read device and a write device that utilize a CPP magnetoresistive film.

FIG. 1 shows a basic constitution of a CPP magnetoresistive head (read device) according to Example 1. FIG. 1(a) is a cross sectional view of a read device as viewed from an air bearing surface side. FIG. 1(b) is a cross sectional view in a device height direction of the read device taken along line A-A in FIG. 1(a). FIG. 1(c) is a view showing a portion below line B-B in FIG. 1(a), and showing a magnetoresistive film, a domain control film, and a heat dissipation layer from above. The CPP magnetoresistive head (read head) 2 includes: a magnetoresistive film (CPP-GMR film) 4 having a fixed layer 6, a free layer 10, the fixed layer 6 and the free layer 10 comprising an alloy containing ferromagnetic material and being stacked while sandwiching an intermediate layer 8 comprising a non-magnetic material therebetween, and an anti-ferromagnetic layer 12 for fixing the magnetization direction of the fixed layer 6; a re-fill insulating film (insulating film) 14 for electrically insulating the magnetoresistive film 4; a domain control film 16 for controlling the magnetization direction of the free layer 10 by way of the re-fill insulating film 14; a first high heat conductivity layer 18 and a second high heat conductivity layer 20 disposed above and below the domain control film 16 respectively; an upper magnetic shield layer 24 and a lower magnetic shield layer 22 which are disposed above the first high heat conductivity layer 18 and below the second high heat conductivity layer 20 respectively and also serve as electrodes; and a heat dissipation layer 26 having a high heat conductivity and a low linear expansion coefficient disposed at the back in the device height direction of the magnetoresistive film 4 and on each side of the domain control film 16.

In the read device 2 of the constitution described above, the free layer 10 changes the magnetization direction thereof by the input magnetization direction from magnetized information recorded in a recording medium. When the magnetization direction of the free layer 10 is changed, the resistance in the magnetic sensor portion changes depending on the difference of the magnetization direction relative to the fixed layer 6. A hard disc drive has a structure in which the resistance variation is converted into an electric signal to read. For reading the resistance variation of the magnetic sensor portion, a sense current is required to flow between the upper magnetic shield layer 24 and the lower magnetic shield layer 22, both serving as the electrodes.

The domain control film 16 is disposed as close as possible to the end of the free layer 10, and has a structure in which a bias magnetic field is applied to the free layer 10. The magnetization direction of the free layer 10 is constituted so as to change with sensitive response to a weak recorded magnetic field of information recorded in the recording medium, and the bias magnetic field has to be applied for ensuring reproducibility and stability of the initial magnetization state and the magnetization state when it is changed upon input of the recording magnetic field. That is, the free layer 10 that causes magnetic rotation by receiving an input magnetic field from the magnetic recording medium generates wall movement upon input of the recording magnetic field when it has domains being not formed as a single domain, this causes various kinds of noises such as Barkhausen noises and a phenomenon such as fluctuation of output, this phenomenon being due to the defection of reproducibility for the initial magnetization state and the magnetization state upon magnetization, and the quality of read signals is deteriorated. For forming the domains of the free layer 10 into a single domain, a structure in which the bias magnetic field is applied to the free layer 10 is adopted.

Figure 2:
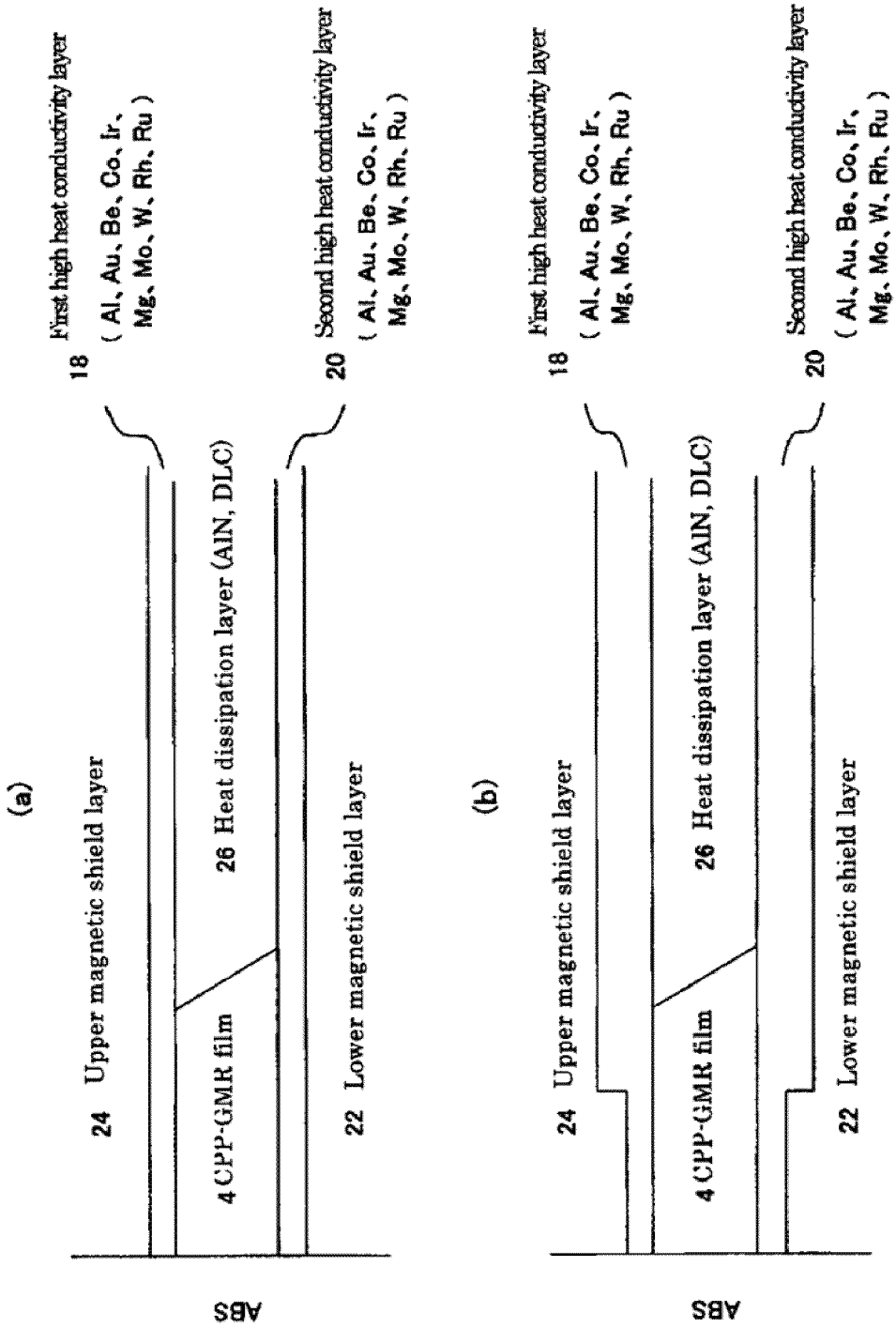
FIG. 2 is a schematic diagram of the CPP magnetoresistive head (read device) according to Example 1.

Then, with reference to FIG. 2(a), FIG. 3 and FIG. 4, description is to be made of materials suitable for the first high heat conductivity layer 18 and the second high heat conductivity layer 20, and materials suitable for the heat dissipation layer 26 having the high heat conductivity and low linear expansion coefficient. FIG. 2(a) shows a schematic view of a read device 2. For the first high heat conductivity layer 18 and the second high heat conductivity layer 20, one of metal elements selected from the group constituting of Al, Au, Be, Co, Ir, Mg, Mo, W, Rh, Ru, and Cr is suitable. As shown in FIG. 3, the metal elements described above are materials having higher heat conductivity and higher electroconductivity compared with NiFe used for the magnetic shield layer serving as the electrode. A material also having a high electroconductivity is preferred for the first high heat conductivity layer 18 and the second high heat conductivity layer 20 since a sense current from the magnetic shield layer serving as the electrode flows therethrough.

Materials suitable for the heat dissipation layer 26 are insulators such as AlN and DLC, or semiconductors such as Si and SiC. In Example 1, AlN (or DLC) was used. As shown in FIG. 4, the materials described above have higher heat conductivity and lower linear expansion coefficient compared with aluminum ($Al_2O_3$) used as the refill insulating film.

With the constitution and the material selection described above, heat generated in the magnetoresistive film (CPP-GMR film) 4 is conducted to the first high heat conductivity layer 18 and the second high heat conductivity layer 20 disposed so as to be in contact with the upper portion and the lower portion of the CPP-GMR film 4 respectively, and then conducted by way of the first high heat conductivity layer 18 and the second high heat conductivity layer 20 to the heat dissipation layer 26 having a high heat conductivity and a low linear expansion coefficient and disposed in contact with the first high heat conductivity layer 18 and the second high heat conductivity layer 20. The heat conducted to the heat dissipation layer 26 is dissipated to an atmospheric air from the air bearing surface (ABS) side of the heat dissipation layer 26.

Figure 5:
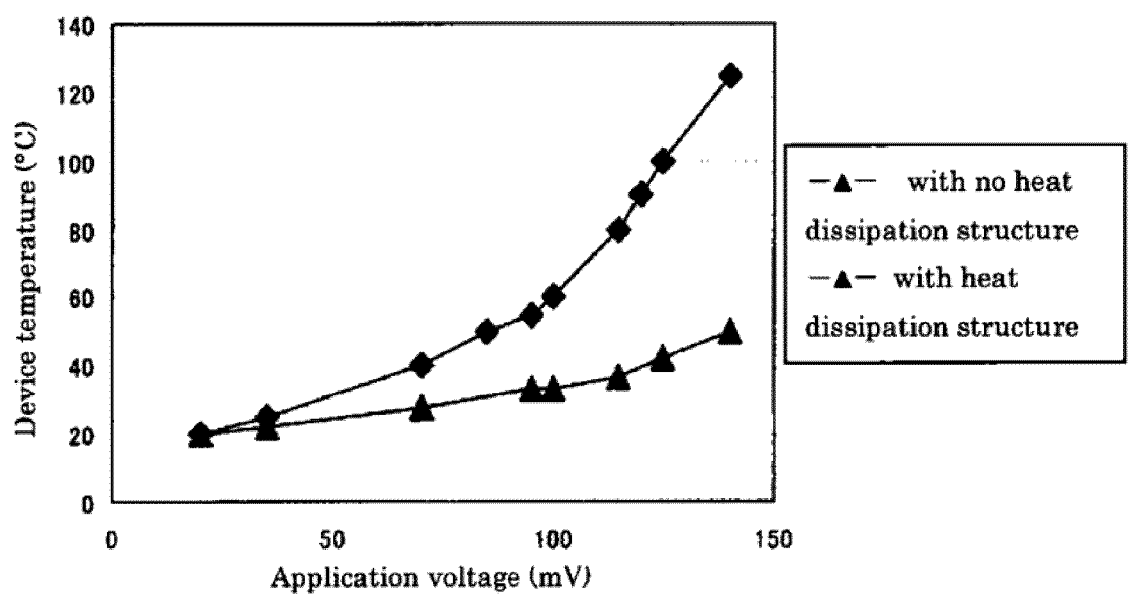
FIG. 5 is a graph showing a relation between an application voltage and a device temperature of a magnetoresistive film.

FIG. 5 shows relations between an application voltage between the upper and the lower shield layers 24 and 22, the shield layers 24 and 22 serving also as the electrodes, and a temperature of the CPP-GMR film 4 (device temperature), concerning with a read device having the heat dissipation structure according to Example 1 and a read device with no heat dissipation structure. As shown in FIG. 5, when the application voltage increases from about 20 mV to about 140 mV, increase of the device temperature is from about 20° C. to about 50° C. in the read device having the heat dissipation structure according to Example 1, whereas it increases from about 20° C. to about 125° C. in the read device with no heat dissipation structure. As described above, the read device having the heat dissipation structure according to Example 1 has an outstandingly higher heat dissipation effect compared with the read device with no heat dissipation structure.

Further, since a material having the high heat conductivity and the low linear expansion coefficient is used for the heat dissipation layer 26, even when the heat is conducted to the heat dissipation layer 26 and the heat dissipation layer 26 itself generates heat, the thermal expansion is small and the heat dissipation effect from ABS is also high. Therefore, the deformation amount of the heat dissipation layer 26 is small. Accordingly, protrusion of the CPP-GMR film 4 from ABS is so small that it can be substantially negligible.

As described above, the CPP magnetoresistive head having the read device according to Example 1 can dissipate heat generated in the magnetoresistive film (CPP-GMR film) rapidly and efficiently, and can prevent protrusion of the magnetoresistive film (CPP-GMR film) from the air bearing surface (ABS) in the process of heat dissipation.

Further, as shown in FIG. 2(b), by changing the thickness of the first high heat conductivity layer 18 and the second heat conductivity layer 20 in the device height direction, that is, by decreasing the thickness on the side of ABS and increasing the thickness in the device height direction, suppression of the widening of a distance between the upper magnetic shield layer 24 and the lower magnetic shield layer 22 in ABS can be possible. With the structure described above, heat generated in the magnetoresistive film (CPP-GMR film) 4 can be conducted efficiently to the heat dissipation layer 26 having the high heat conductivity and the low linear expansion coefficient while suppressing side reading of the magnetic information from the recording medium, the side reading being generated by the increase of distance between the upper and lower magnetic shields.

Figure 6:
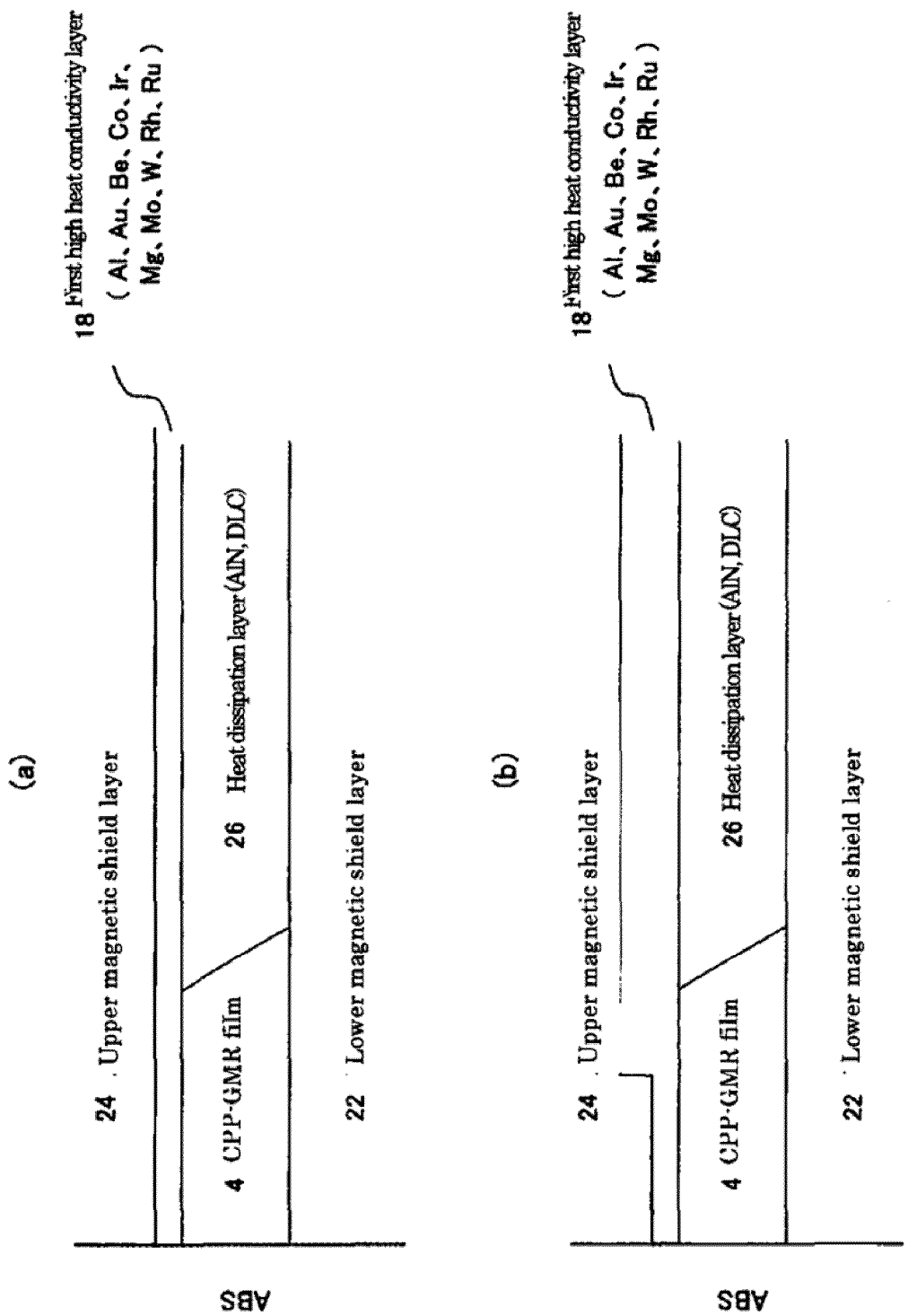
FIG. 6 is a schematic diagram showing a modified example of a CPP magnetoresistive head (read device) according to Example 1.
Figure 7:
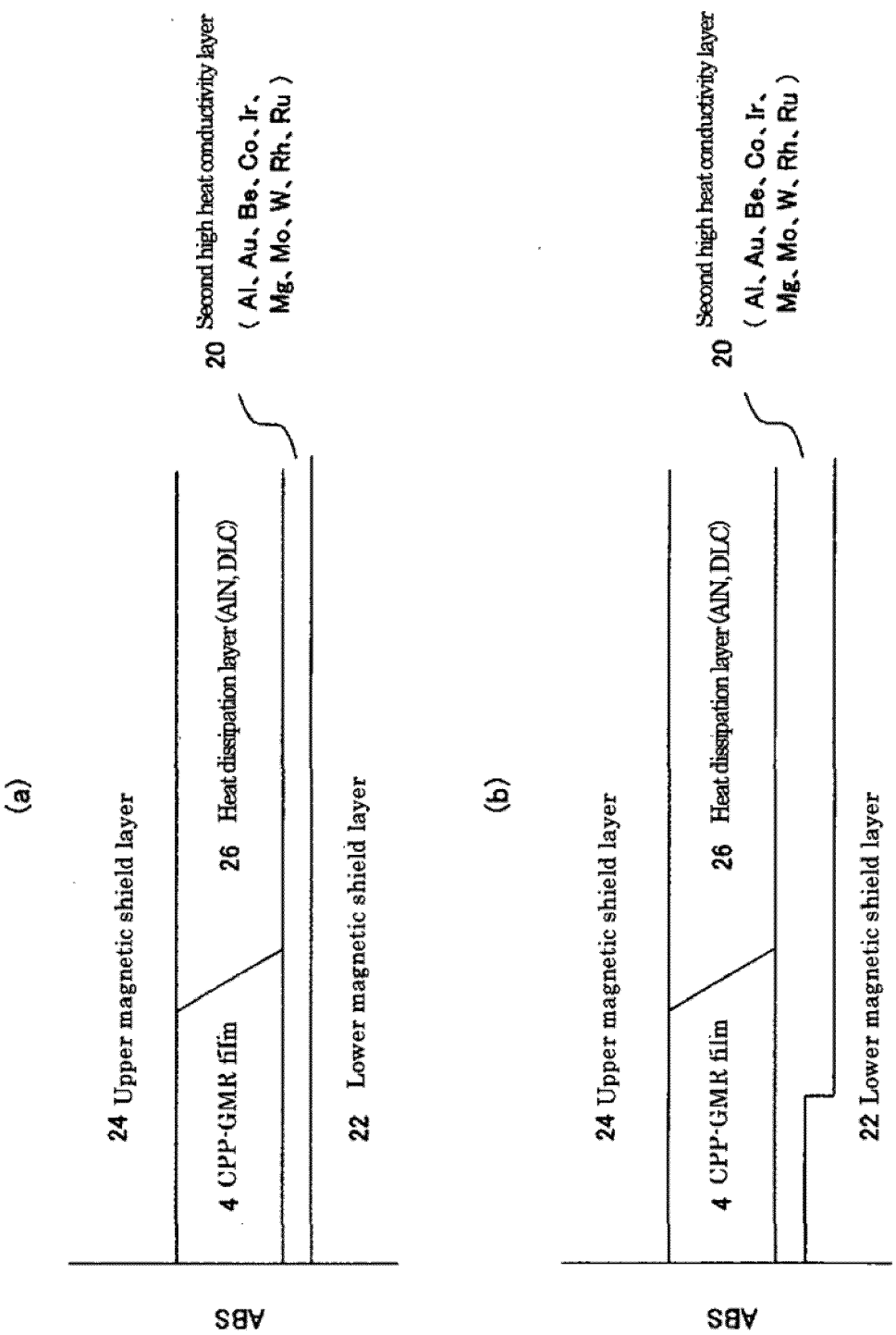
FIG. 7 is a schematic diagram showing a modified example of a CPP magnetoresistive head (read device) according to Example 1.

Then, a modified embodiment of Example 1 is to be described with reference to FIG. 6(a) and FIG. 7(a). FIG. 6(a) shows an example in which a first high conductivity layer 18 is disposed so as to be in contact with the upper portions of a magnetoresistive film (CPP-GMR film) 4 and a heat dissipation layer 26 having a high heat conductivity and a low linear expansion coefficient. FIG. 7(a) is an example in which a second high conductivity layer 20 is disposed so as to be in contact with the lower portions of a magnetoresistive film (CPP-GMR film) 4 and a heat dissipation layer 26 having a high heat conductivity and a low linear expansion coefficient. Also in the constitutions described above, following advantages can be obtained although they are slightly inferior when compared with Example 1. Since the heat generated from the magnetoresistive film (CPP-GMR film) 4 is conducted by way of the first high heat conductivity layer 18 or the second high heat conductivity layer 20 to the heat dissipation layer 26 having the high heat conductivity and the low linear expansion coefficient, the heat dissipation efficiency is high. Furthermore, protrusion of the magnetoresistive film (CPP-GMR film) 4 from ABS can be prevented since the thermal linear expansion coefficient of the heat dissipation layer 26 is low.

Further, by changing the thickness of a first heat conductivity layer 18 or a heat conductivity layer 20 in the device height direction as shown in FIG. 6(b) and FIG. 7(b), that is, by decreasing the thickness on the side of ABS and increasing the thickness in the device height direction, suppression of the widening of the distance between the upper magnetic shield layer 24 and the lower magnetic shield layer 22 in ABS can be possible. With the structure described above, heat generated in the magnetoresistive film (CPP-GMR film) 4 can be conducted efficiently to the heat dissipation layer 26 having the high heat conductivity and the low linear expansion coefficient while suppressing side reading of the magnetic information from the recording medium, the side reading being generated by the increase of distance between the upper and lower magnetic shields.

Figure 8:
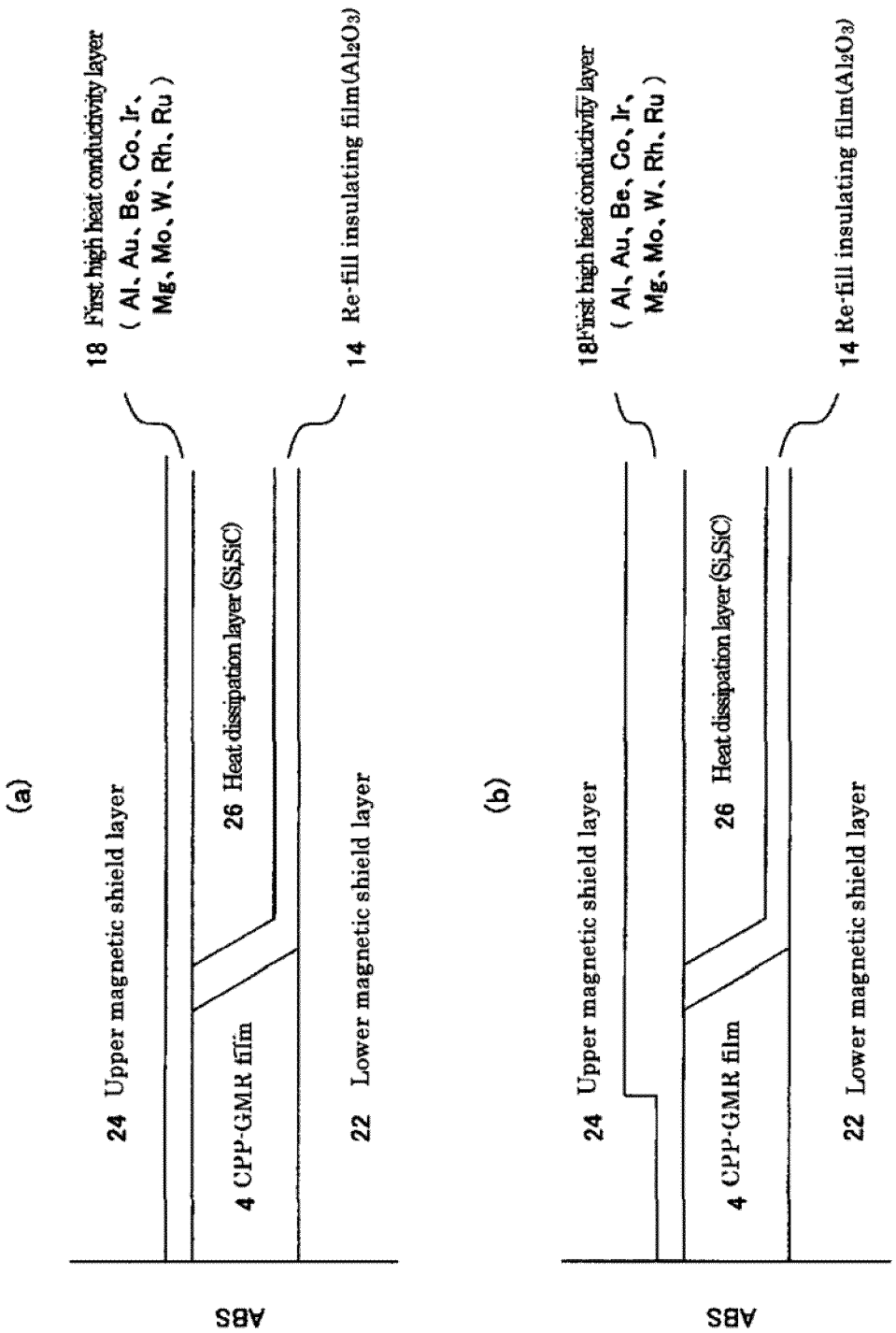
FIG. 8 is a schematic diagram showing a modified example of a CPP magnetoresistive head (read device) according to Example 1.

Then, another modified example of Example 1 is to be described with reference to FIG. 8(a). The constitution shown in FIG. 8(a) is an example in which a semiconductor such as Si or SiC is used for a heat dissipation layer 26 having a high heat conductivity and a low linear expansion coefficient, a re-fill insulating film 14 of alumina ($Al_2O_3$) is disposed between the back of a magnetoresistive film (CPP-GMR film) 4 and the heat dissipation layer 26, and a first high heat conductivity layer 18 is disposed so as to be in contact with the upper portions of the magnetic resistive film (CPP-GMR film) 4 and the heat dissipation layer 26. Also in this constitution, following advantages can be obtained although they are slightly inferior compared with Example 1. Since heat generated from the magnetoresistive film (CPP-GMR film) 4 is conducted by way of the first high conductivity layer 18 to the heat dissipation layer 26 having the high heat conductivity and the low linear expansion coefficient, the heat dissipation efficiency is high. Furthermore, since the linear expansion coefficient of the heat dissipation layer 26 is low, protrusion of the magnetoresistive film (CPP-GMR film) 4 from ABS can be prevented.

Further, by changing the thickness of a first high heat conductivity layer 18 in the device height direction as shown in FIG. 8(b), that is, by decreasing the thickness on the side of the ABS and increasing the thickness in the device height direction, increase of the gap between an upper magnetic shield layer 24 and a lower magnetic shield layer 22 in ABS can be suppressed. With the constitution described above, it is possible to efficiently conduct the heat generated in the magnetoresistive film (CPP-GMR film) 4 to the heat dissipation layer 26 having the high heat conductivity and the low linear expansion coefficient while suppressing side reading of magnetic information from the recording medium, the side reading being generated by the increase of the distance between the upper and lower magnetic shields.

Figure 9:
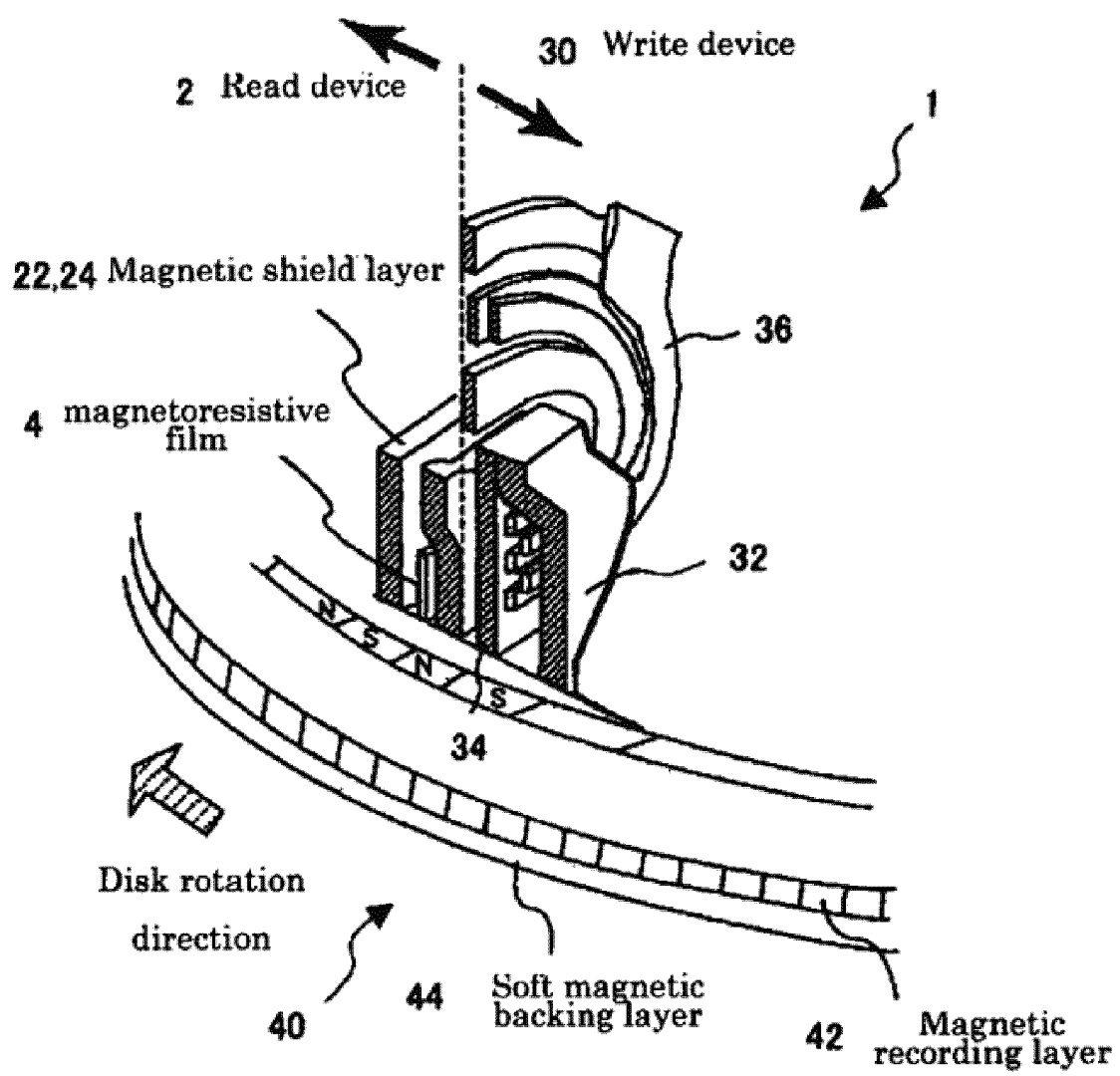
FIG. 9 is a diagram showing a perspective view of a CPP magnetoresistive head according to Example 2 in relation with a magnetic disk.
Figure 10:
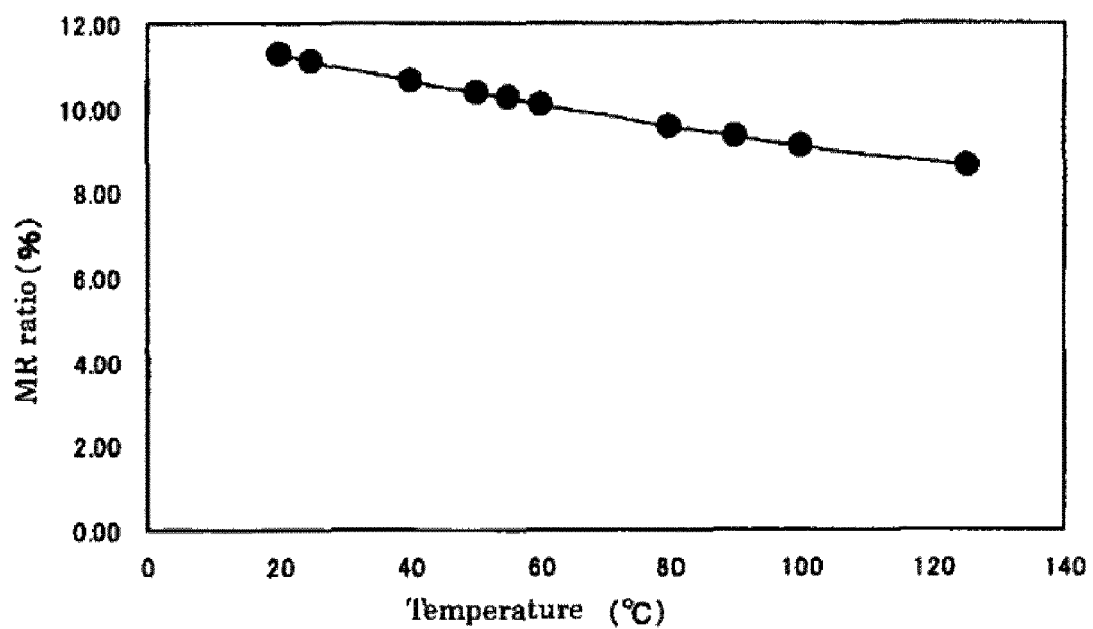
FIG. 10 is a graph showing the temperature dependence of an MR ratio of an existent CPP magnetoresistive head.

Then, with reference to FIG. 9, a CPP magnetoresistive head having a read device explained as Example 1 and a modified example thereof and a write device in combination is to be described as Example 2. FIG. 9 shows the CPP magnetoresistive head in relation with a magnetic disk. The CPP magnetoresistive head 1 has a read device 2 and a write device 30. The read device 2 is a read device described as Example 1 and the modified embodiment thereof and has a CPPGMR film 4 provided between a pair of magnetic shield layers 22, 24. The write device 30 is a head generating a magnetic field for recoding to a magnetic recording layer 42 of a magnetic disk 40, and is a single pole head having a main pole 32, an auxiliary pole 34, and a thin film coil 36 crossing a magnetic circuit formed with the main pole and the auxiliary pole. The read device 2 reads information written into the magnetic recording layer 42 of the magnetic disk 40. A magnetic flux going out of the main pole 32 of the write device 30 establishes a magnetic path that passes through a magnetic recording layer 42 and a soft magnetic backing layer 44 of the magnetic disk 40 and returns to the auxiliary pole 34, and writes the magnetization pattern in the magnetic recording layer 42. According to the CPP magnetoresistive head 1, high density recording is possible by using a single pole head as the write device 30. Further, since the heat generated from the CPP-GMR film 4 can be dissipated rapidly and efficiently to prevent protrusion of the CPP-GMR film 4 from the air bearing surface in the process of heat dissipation during reading, magnetic information recorded at high density can be read as a high quality signal.

The following list is a description of the reference numerals and signs, and is provided for quick reference to the references consistent throughout the various figures included herein:

1: CPP magnetoresistive head
2: CPP magnetoresistive head (read device)
4: Magnetoresistive film (CPP-GMR film)
6: Fixed layer
8: Non-magnetic intermediate layer
10: Free layer
12: Anti-ferromagnetic layer
14: Re-fill insulating film
16: Domain control film
18: First high heat conductivity layer
20: Second high heat conductivity layer
22: Lower magnetic shield layer
24: Upper magnetic shield layer
26: Heat dissipation layer having high heat conductivity and low linear expansion coefficient
30: Write device
32: Main pole
34: Auxiliary pole
36: Thin film coil While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A CPP magnetoresistive head including:
    a magnetoresistive film comprising:
        a free layer above a non-magnetic intermediate layer; and
        a fixed layer below the non-magnetic intermediate layer, wherein the magnetoresistive film is between a lower magnetic shield layer and an upper magnetic shield layer; and
    a domain control film disposed by way of an insulating film on each side of the magnetoresistive film, wherein a sense current flows through the magnetoresistive film between the upper magnetic shield layer and the lower magnetic shield layer; and
    a high heat conductivity layer disposed between the upper magnetic shield layer and the magnetoresistive layer or between the lower magnetic shield layer and the magnetoresistive film; and
    a heat dissipation layer having a high heat conductivity and a low linear expansion coefficient, the heat dissipation layer being disposed at the back in a device height direction of the magnetoresistive film and on each side of the domain control film, wherein the heat dissipation layer is disposed between the high heat conductivity layer and the upper magnetic shield layer or the lower magnetic shield layer.

2. The CPP magnetoresistive head according to claim 1, wherein at least one high heat conductivity layer is disposed between the upper magnetic shield layer and the magnetoresistive film and wherein at least one high heat conductivity layer is disposed between the lower magnetic shield layer and the magnetoresistive film.

3. The CPP magnetoresistive head according to claim 1, wherein a thickness of the high heat conductivity layer is varied in the device height direction.

4. The CPP magnetoresistive head according to claim 3, wherein the thickness of the high heat conductivity layer increases in the device height direction.

5. The CPP magnetoresistive head according to claim 1, wherein the non-magnetic intermediate layer has a conductive property.

6. The CPP magnetoresistive head according to claim 1, wherein the non-magnetic intermediate layer has an insulative property.

7. The CPP magnetoresistive head according to claim 1, wherein the heat dissipation layer having the high heat conductivity and the low linear expansion coefficient comprises AlN or DLC.

8. The CPP magnetoresistive head according to claim 1, wherein the high heat conductivity layer comprises at least one element selected from the group consisting of Al, Au, Be, Co, Ir, Mg, Mo, W, Rh, Ru, and Cr.

9. The CPP magnetoresistive head according to claim 8, wherein the heat dissipation layer having the high heat conductivity and the low linear expansion coefficient comprises AlN or DLC.

10. The CPP magnetoresistive head according to claim 1, wherein an insulating film is disposed between the magnetoresistive film and the heat dissipation layer having the high heat conductivity and the low linear expansion coefficient.

11. The CPP magnetoresistive head according to claim 10, wherein the insulating film comprises $Al_2O_3$.

12. The CPP magnetoresistive head according to claim 10, wherein the heat dissipation layer having the high heat conductivity and the low linear expansion coefficient comprises Si or SiC.

13. The CPP magnetoresistive head according to claim 12, wherein the high heat conductivity layer comprises at least one element selected from the group consisting of Al, Au, Be, Co, Ir, Mg, Mo, W, Rh, Ru, and Cr.

14. A CPP magnetoresistive head comprising:
    a read device including a magnetoresistive film having:
        a free layer above a non-magnetic intermediate layer; and
        a fixed layer below the non-magnetic intermediate layer; and wherein the magnetoresistive head is between a lower magnetic shield layer and an upper magnetic shield layer; and a domain control film disposed by way of an insulating film on each side of the magnetoresistive film, wherein a sense current flows through the magnetoresistive film between the upper magnetic shield layer and the lower magnetic shield layer; and a high heat conductivity layer disposed between the upper magnetic shield layer and the magnetoresistive film or between the lower magnetic shield layer and the magnetoresistive film; and a heat dissipation layer having a high heat conductivity and a low linear expansion coefficient, the heat dissipation layer being disposed at the back in a device height direction of the magnetoresistive film and on each side of the domain control film, wherein the heat dissipation layer is disposed between the high heat conductivity layer and the upper magnetic shield layer or the lower magnetic shield layer; and a write device disposed adjacent to the read device.

15. The CPP magnetoresistive head according to claim 14, wherein the heat dissipation layer having the high heat conductivity and the low linear expansion coefficient comprises AlN or DLC.

16. The CPP magnetoresistive head according to claim 15, wherein the high heat conductivity layer comprises at least one element selected from the group consisting of Al, Au, Be, Co, Ir, Mg, Mo, W, Rh, Ru, and Cr.

17. The CPP magnetoresistive head according to claim 14, wherein an insulating film is provided between the magnetoresistive film and the heat dissipation layer having the high heat conductivity and the low linear expansion coefficient.

18. The CPP magnetoresistive head according to claim 17, wherein the heat dissipation layer having the high heat conductivity and the low linear expansion coefficient comprises Si or SiC.

19. The CPP magnetoresistive head according to claim 18, wherein the high heat conductivity layer comprises at least one element selected from the group consisting of Al, Au, Be, Co, Ir, Mg, Mo, W, Rh, Ru, and Cr.

* * * * *